United States Patent
Nir et al.

(10) Patent No.: US 9,697,107 B2
(45) Date of Patent: Jul. 4, 2017

(54) TESTING APPLICATIONS

(75) Inventors: Dor Nir, Yahud (IL); Dror Saaroni, Yahud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 50 days.

(21) Appl. No.: 13/457,195

(22) Filed: Apr. 26, 2012

(65) Prior Publication Data

US 2013/0290938 A1   Oct. 31, 2013

(51) Int. Cl.
G06F 9/44 (2006.01)
G06F 11/36 (2006.01)

(52) U.S. Cl.
CPC .................. G06F 11/3672 (2013.01)

(58) Field of Classification Search
CPC ................................... G06F 11/3672
USPC ......................................... 717/130
See application file for complete search history.

(56) References Cited

U.S. PATENT DOCUMENTS

| | | | |
|---|---|---|---|
| 7,698,690 B2 | 4/2010 | Krauss | |
| 7,757,124 B1 | 7/2010 | Singh et al. | |
| 7,975,262 B2 | 7/2011 | Cozmei | |
| 2003/0046029 A1 | 3/2003 | Wiener et al. | |
| 2009/0199160 A1* | 8/2009 | Vaitheeswaran et al. | 717/124 |
| 2009/0199161 A1 | 8/2009 | Cutler | |
| 2010/0275184 A1 | 10/2010 | Nir et al. | |
| 2011/0072418 A1* | 3/2011 | Kalamegham et al. | 717/128 |
| 2011/0107304 A1 | 5/2011 | Saaroni et al. | |

OTHER PUBLICATIONS

Zend Technologies Ltd., "Troubleshooting PHP Issues with Zend Server Code Tracing," White Paper, Jan. 2010, pp. 1-13, available at http://static.zend.com/topics/Troubleshooting-PHP-Issues-With-Code-Tracing--.pdf.

* cited by examiner

*Primary Examiner* — John Chavis

(57) ABSTRACT

A system and method for testing an application are provided herein. The method includes automatically executing a script for testing an application, collecting test step information corresponding to test steps performed in accordance with the script, and collecting profiling information during execution of the script. The test step information and the profiling information include data that are used to automatically synchronize the test step information and the profiling information.

19 Claims, 4 Drawing Sheets

200

TESTING APPLICATIONS

BACKGROUND

The automatic testing of an application may be performed to generate information relating to defects within the application. This information may be used by application developers to improve the application. However, according to current techniques, it is difficult for application developers to determine the root causes of such defects within an application. Application developers may attempt to build the exact environment, or perform the exact scenario, described in a defect description, or may attempt to debug the application code step by step in order to understand the root cause of a defect. However, this process may become very costly and time-consuming when the scenario to be reproduced extends over a long time period. In addition, this process may become very costly and time-consuming when the environment is not trivial, e.g., when the testing is not performed on a clean machine, meaning that a developer has to run many steps in order to bring the application to a desired starting point.

BRIEF DESCRIPTION OF THE DRAWINGS

Certain examples are described in the following detailed description and in reference to the drawings, in which.

DETAILED DESCRIPTION OF SPECIFIC EXAMPLES

Techniques described herein relate generally to the testing of applications within a computing environment. More specifically, techniques described herein relate to the automatic synchronization of test steps for an application and the actual application flow. As used herein, the term "automatic" refers to any type of automated machine process.

Testing an application may involve executing a number of test steps. In examples, each of the test steps may be executed in response to a user's interaction with the application. The user may direct the testing procedure by providing input via a graphical user interface (GUI) generated by or associated with the application. In other examples, each of the test steps may be automatically executed without actual input from the user. For example, the testing procedure may occur automatically using a pre-determined script that interacts with the GUI of the application to mimic the input that could be provided by the user during normal use of the application. The script may be executed, and a profiler may monitor the behavior of the application while the script is running.

The execution of each test step may result in one or more function calls being initiated by the application. For example, if a test step involves inputting several numbers into a calculator application, the calculator application may respond by executing particular function calls for performing some mathematical function based on the input numbers. In examples, the execution of a series of function calls by the application is referred to as the application flow. During the running of the script, the internal operations of the application may be recorded via the profiler as profiling information. The profiling information may enable a software developer to determine whether the application is behaving appropriately, identify errors, determine the cause of the errors, and the like. Furthermore, a script executor may synchronize the profiling information with the test step information, thus enabling the developer to quickly and easily identify the sequence of test steps that produced a particular application state as indicated by the profiling information. In addition, the synchronization of the test step information and the profiling information may allow the developer to determine the causes of particular errors or failure events within the application. According to the techniques described herein, the test step information and the profiling information may be synchronized without any change to the source code of the application.

Figure 1:
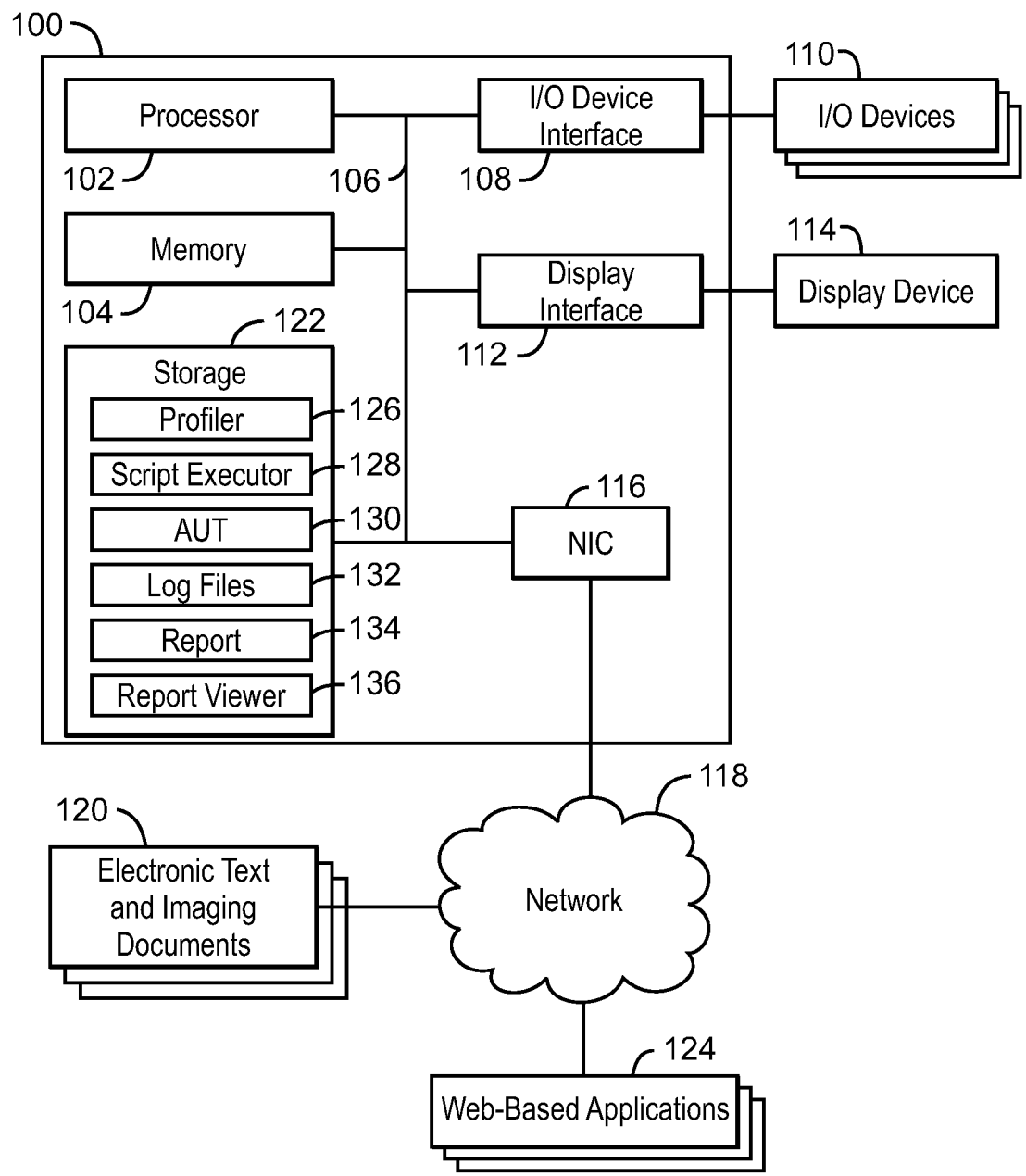
FIG. 1 is a block diagram of a computing device that may be used to perform the application testing procedure described herein.

FIG. 1 is a block diagram of a computing device 100 that may be used to perform the application testing procedure described herein. The computing device 100 may be, for example, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. The instructions that are executed by the processor 102 may be used to implement an application testing procedure that includes synchronizing test step information and profiling information obtained during the testing of an application. As used herein, the term "profiling information" refers to any type of information relating to an application that may assist in the debugging of the application. For example, profiling information may include function call stacks, parameters passed to the application during the execution of the script, exception data, or the like.

The processor 102 may be connected through a bus 106 to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the bus 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100.

A network interface card (NIC) 116 may be adapted to connect the computing device 100 through the bus 106 to a network 118. The network 118 may be a wide area network (WAN), local area network (LAN), or the Internet, among others. Through the network 118, the computing device 100 may access electronic text and imaging documents 120. The computing device 100 may also download the electronic text and imaging documents 120 and store the electronic text and imaging documents 120 within a storage device 122 of the computing device 100. Through the network 118, the computing device 100 may also access a number of Web-based applications 124. The Web-based applications 124 may be downloaded and stored within the storage device 122 of the computing device 100.

The storage device 122 can include a hard drive, an optical drive, a thumbdrive, an array of drives, or any combinations thereof. The storage device 122 may include a profiler 126 and a script executor 128 that are configured to perform the techniques for application testing that are described herein. In examples, a script for an application under test (AUT) 130 may be executed. The script may include automatic test steps for testing the AUT 130. Such test steps may correspond to actions that can be performed by a user interacting with a user interface (not shown), such as a GUI, of the computing device 100. In addition, the test steps may include particular interactions with the AUT 130, such as clicking on a specific button or inputting specific data or parameters into the AUT 130.

The profiler 126 may generate log files 132 that correspond to the execution of the script. The log files 132 may include test step information that identify the automatic test steps that were performed, as well as profiling information relating to the behavior of the AUT 130 during the test. The script executor 128 may then synchronize the test step information and the profiling information. Such a synchronization procedure may be performed using synchronization data within the test step information and the profiling information. For example, the test step information and the profiling information may include timestamps that may be used to determine the correspondence between the test step information and the profiling information. As another example, the test step information and the profiling information may include checkpoints that indicate specific points during the testing procedure at which the test step information and the profiling information correspond with one another.

In examples, the synchronized test step information and profiling information can be used to generate a report 134 relating to the AUT 130. The report 134 may be generated by the script executor 128. In addition, synchronizing the test step information and the profiling information may enable the user of the report 134 to easily identify the correspondence between the test steps executed and the corresponding actions of the AUT 130. Further, the log files 132 and the report 134 can be stored within the storage device 122.

In addition, the storage device 122 may include a report viewer 136 configured to display the report 134 to a user of the computing device 100 via the display device 114. The user of the computing device 100 may be, for example, a developer of the AUT 130 or a quality assurance (QA) tester of the AUT 130. In examples, the user utilizes the report 134 to determine appropriate modifications to the AUT 130.

It is to be understood that the block diagram of FIG. 1 is not intended to indicate that the computing device 100 is to include all of the components shown in FIG. 1. Further, the computing device 100 may include any number of additional components not shown in FIG. 1, depending on the specific implementation.

Figure 2:
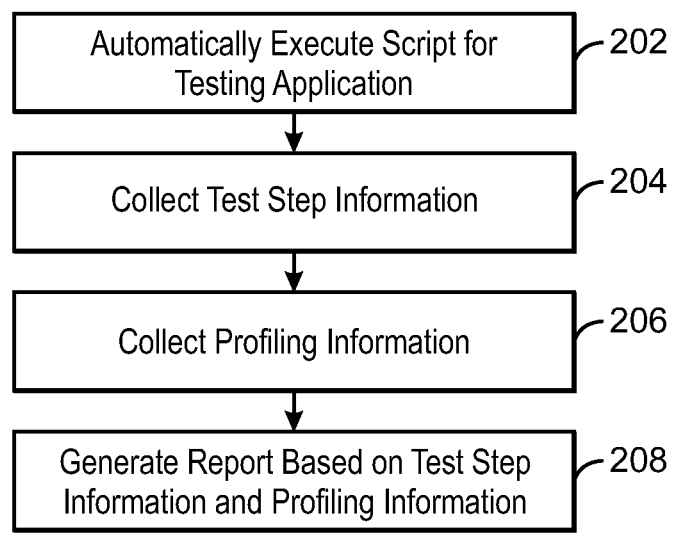
FIG. 2 is a process flow diagram showing a method for testing an application.

FIG. 2 is a process flow diagram showing a method 200 for testing an application. According to the method 200, the test step information and the profiling information for an application may be synchronized. The synchronized test step information and profiling information may be used to determine whether the application is behaving as expected. In examples, the method 200 is performed by the profiler 126 and the script executor 128 within the storage device 122 of the computing device 100 discussed above with respect to FIG. 1. In addition, the application that is utilized according to the method 200 may be the AUT 130 discussed above with respect to FIG. 1.

The method begins at block 202, at which a script for testing an application is automatically executed. The script may include test steps to be used to test the functioning of the application. Each test step may correspond to an action that a user would perform through the use of the graphical user interface, such as, for example, clicking a button or entering text into a text box.

At block 204, test step information corresponding to the test steps performed in accordance with the script is collected. In examples, collecting the test step information includes storing the test step information to the log files 132 during the execution of the script. Such test step information may include data relating to the specific test steps that were executed according to the script, including the order of execution. For example, the test step information may include data relating to the number of iterations that were performed for each test step. The log file may also include data used for the synchronization of the test step information with the profiling information. For example, each test step that was executed may be associated with a corresponding timestamp that indicates the time at which the test step was executed.

At block 206, profiling information is collected during the execution of the script. In examples, collecting the profiling information includes storing the profiling information to the log files 132 during the execution of the script. The profiling information may include application function calls executed during the execution of the functional test steps. The profiling information may also include data regarding the parameters passed to the application during the execution of the functional test steps, such as the name, value, and types of the parameters. The profiling information may include the value of parameters returned by the corresponding function calls. The profiling information may also include exception data obtained from the application during the execution of the functional test steps, including error codes and the like. The log file may also include data used for the synchronization of the profiling information with the test step information. For example, each function call may be associated with a corresponding timestamp that indicates the time at which the function call was executed.

In examples, corresponding synchronization data within the test step information and the profiling information are used to automatically synchronize the test step information with the profiling information. Automatically synchronizing the test step information and the profiling information may include pairing the test step information from each test step with corresponding profiling information. In examples, the corresponding synchronization data within the test step information and the profiling information includes timestamp data, and the synchronization procedure is performed based on time of execution. However, the synchronization procedure may also be performed based on any number of other parameters. For example, such data may include specific markers or checkpoints within the test step information and the profiling information, which may be used to determine the appropriate correspondence between the test step information and the profiling information.

At block 208, a report is generated based on the test step information and the profiling information. The report may include specific information relating to the testing procedure. For example, the report may include information relating to the synchronization of the test step information and the profiling information. Such information may include, for example, information relating to the manner in which function calls within the profiling information correspond to particular test steps within the test step information. In addition, the report may indicate specific application errors that were identified from the profiling information.

The report may be used to analyze the performance of the application. For example, the report may be used to determine occurrences of errors, such as exceptions, suspicious parameters passed to the application, or suspicious function call flows, among others. Providing synchronization between the test step information and the profiling information makes it easier for an analyst, such as a software developer, to determine the root causes of such errors. For example, the analyst may be able to quickly associate each particular function call with the sequence of test steps that lead to the function call. By having access to this information, the analyst is freed from the task of attempting to recreate a particular error through manual interaction with the application interface.

The report may be sent to a report viewer that is configured to display the report to a user via a display device of the computing device. In examples, the report is an interactive report, and the user is allowed to manipulate the interactive report via a user interface, as discussed further with respect to FIG. 3.

It is to be understood that the process flow diagram of FIG. 2 is not intended to indicate that blocks 202-208 are to be executed in any particular order, or that all of the blocks are to be included in every case. Further, any number of additional blocks may be included within the method 200, depending on the specific implementation. For example, the method 200 may include generating a movie based on the test step information and profiling information. The movie may be a video that displays useful information from the report to the user via the display device. The useful information may include significant errors or failure events that occurred during the execution of the script for testing the application. Such a movie may be displayed to the user in response to user input via a user interface.

Figure 3:
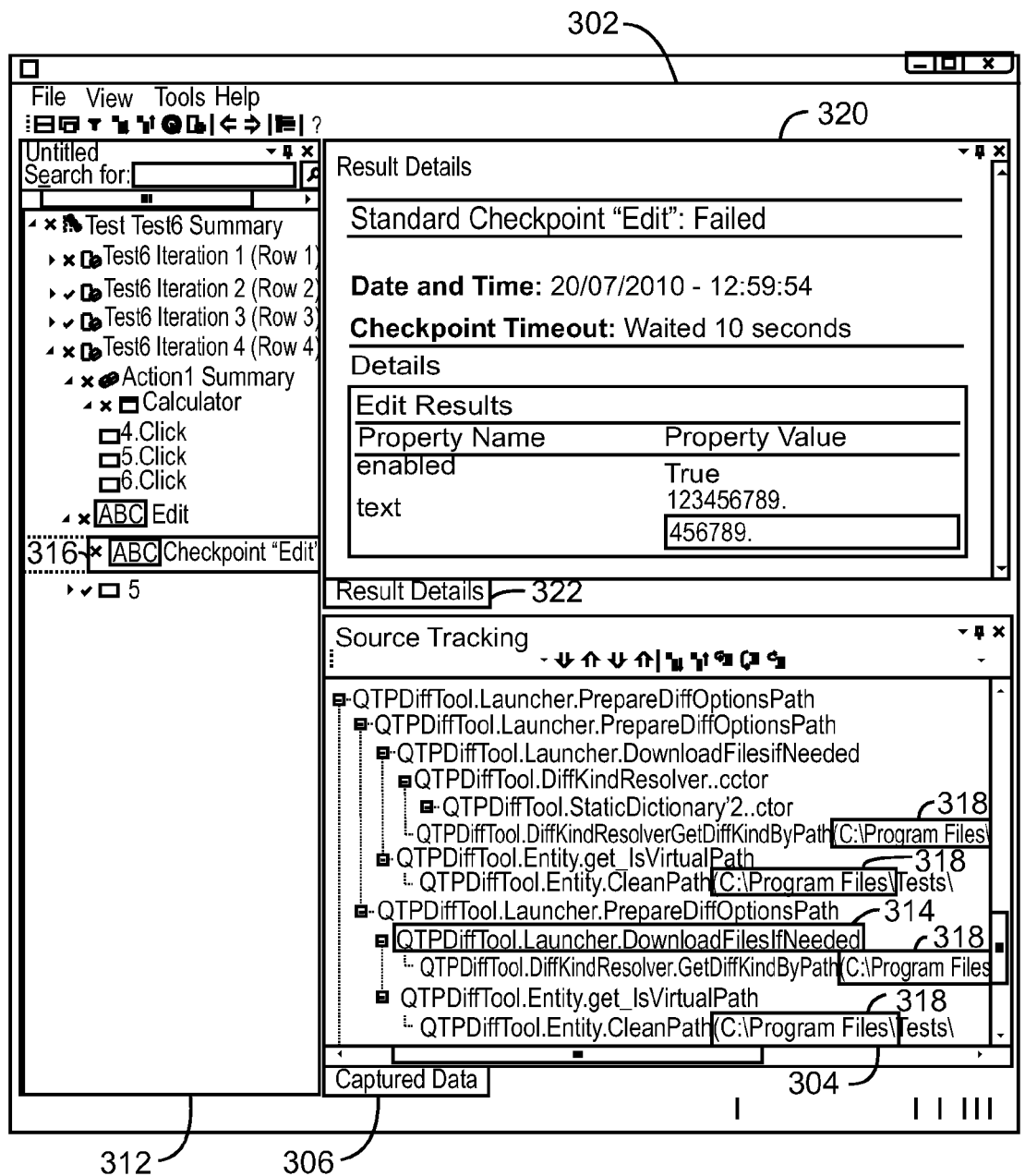
FIG. 3 is a schematic of a user interface used to display a report that may be generated according to the application testing procedure described herein.

FIG. 3 is a schematic of a user interface 300 used to display a report 302 that may be generated according to the application testing procedure described herein. In examples, the user interface 300 is displayed by the computing device 100 via the display device 114, as discussed with respect to FIG. 1. In addition, the user interface 300 may be a graphical user interface.

The panes 304 and 320 of the user interface 300 may be configured to display the profiling information related to a specific execution of an application test script. For example, as shown in FIG. 3, the pane 304 may display captured data 306 including a call stack corresponding to the function calls that were generated during the execution of the script.

A pane 312 of the user interface 300 may be configured to display the test step information corresponding to test steps performed in accordance with a script for testing the application. For example, as shown in FIG. 3, high-level information relating to the overall testing procedure may be displayed within the pane 312 of the user interface 300. For example, the pane 312 may only display information relating to an overall correspondence between the test step information and the profiling information. However, it is to be understood that more detailed information relating to the specific test steps may also be displayed within the pane 312 of the user interface 300. For example, the pane 312 may display each action that was executed during a particular test step, rather than displaying only the general type of testing process that was executed during the test step.

The profiling information in the pane 304 may be synchronized with the test step information in the pane 312. For example, a particular function call 314 in the application flow displayed in the pane 304 and a corresponding test step 316 displayed in the pane 312 may be simultaneously highlighted, or otherwise emphasized. For example, if the user selects a particular test step, the corresponding function call may then be simultaneously highlighted. If the user selects a particular function call, the corresponding test step may be simultaneously highlighted. This is shown in FIG. 3 wherein the function call 314 and the corresponding test step 316 are both highlighted, indicating that the function call 314 and the test step 316 are correlated. Thus, the user may interact with the user interface 300 to dynamically alter the information that is being displayed within the report 302.

In addition, particular function calls 318 within the application flow may be automatically highlighted in the pane 304, as shown in FIG. 3. Such function calls 318 may relate to specific events that occurred during the execution of the script for testing the application. For example, function calls for which an exception was returned may be highlighted within the pane 304. The highlighting of the function calls 318 may allow the developer of the application, or any viewer of the report 302, to easily determine the points in the application flow at which application errors have occurred. Further, a number of function calls 318 relating to a single event may be simultaneously highlighted within the pane 304. For example, a number of function calls 318 relating to a suspicious application flow sequence or including a suspicious argument value may be highlighted.

The user interface 300 may also include an information pane 320 that is configured to display information relating to the particular testing procedure, such as result details 322. The result details 322 may include detailed information regarding a selected function call, test step, or both. For example, the information pane 320 may list the names and values of variables passed to a function call or returned by the function call. If the selected test step or function call corresponds with an error, details of the error may be included in the information pane 320. The information pane may 320 also include synchronization information corresponding to the test step or function call such as the timestamp that identifies the time at which the test step and function call were both executed.

It is to be understood that the schematic of FIG. 3 is not intended to indicate that the user interface 300 is to include all of the components shown in FIG. 3. Further, the user interface 300 may include any number of additional components not shown in FIG. 3, depending on the specific implementation. In some examples, the profiling information and the test step information can be synced to other elements, such as movies, images, application logs, or other application information providers, among others.

Figure 4:
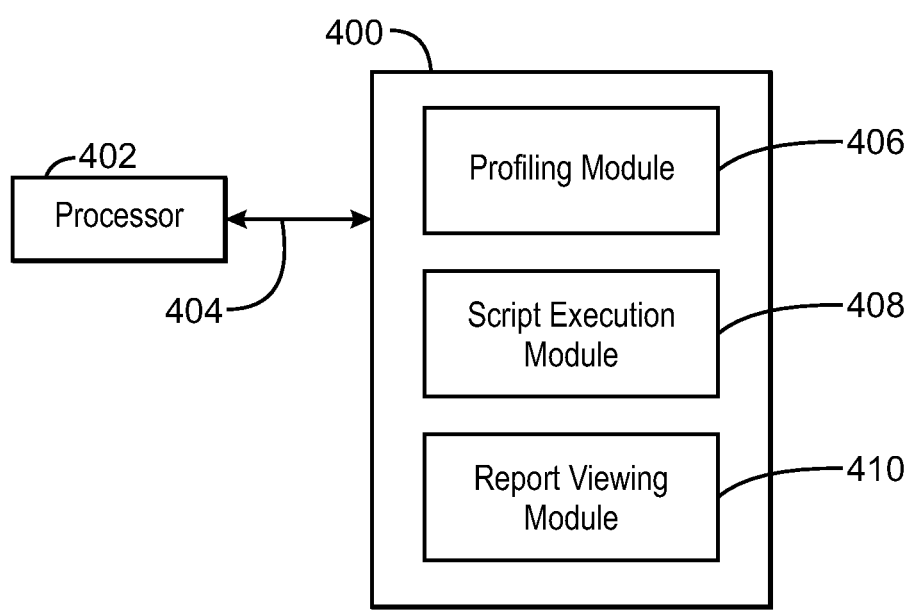
FIG. 4 is a block diagram showing a tangible, non-transitory, computer-readable medium that stores a protocol adapted to execute an application testing procedure.

FIG. 4 is a block diagram showing a tangible, non-transitory, computer-readable medium 400 that stores a protocol adapted to execute an application testing procedure. The tangible, non-transitory, computer-readable medium 400 may be accessed by a processor 402 over a computer bus 404. Furthermore, the tangible, non-transitory, computer-readable medium 400 may include code to direct the processor 402 to perform the steps of the current method.

The various software components discussed herein may be stored on the tangible, non-transitory, computer-readable medium 400, as indicated in FIG. 4. For example, a profiling module 406 may be configured to direct the processor 402 to monitor and collect profiling information during the execution of a script for testing an application. A script execution module 408 may be configured to direct the processor 402 to synchronize the test step information and the profiling information collected during the execution of the script, and generate a report based on the synchronized information. In addition, a report viewing module 408 may be configured to direct the processor 402 to display an interactive version of the report via a display device.

It is to be understood that FIG. 4 is not intended to indicate that all of the software components discussed above are to be included within the tangible, non-transitory, computer-readable medium 400 in every case. Further, any number of additional software components not shown in FIG. 4 may be included within the tangible, non-transitory, computer-readable medium 400, depending on the specific implementation.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method of a computer, comprising:
   automatically executing a script for testing an application;
   collecting test step information corresponding to a plurality of test steps performed in accordance with the script, the collected test step information comprising synchronization data values for respective test steps of the plurality of test steps;
   collecting profiling information during execution of the script, the collected profiling information comprising application function calls and synchronization data values associated with the application function calls; and
   automatically synchronizing the test step information and the profiling information using the synchronization data values in the collected test step information and the synchronization data values in the collected profile information.

2. The method of claim 1, wherein automatically synchronizing the test step information and the profiling information comprises pairing a given test step of the plurality of test steps with a corresponding given application function call of the application function calls in the collected profiling information, the given application function call executed in response to performing the given test step responsive to executing the script.

3. The method of claim 2, further comprising generating a visualization based on the synchronized test step information and profiling information.

4. The method of claim 3, further comprising, responsive to highlighting of the given test step in the visualization, causing highlighting of the given application function call in the visualization.

5. The method of claim 1, further comprising using the synchronized test step information and profiling information to determine whether the application is exhibiting an error.

6. The method claim 1, further comprising using the synchronized test step information and profiling information to determine occurrences of exceptions, suspicious parameters passed to the application, or suspicious function call flows, or any combinations thereof.

7. The method of claim 1, wherein the synchronization data values in the collected test step information comprise timestamps associated with the respective test steps, each timestamp in the collected test step information indicating when a respective test step of the plurality of test steps was performed, and the synchronization data values in the collected profiling information comprise timestamps associated with the application function calls, each timestamp in the collected profiling information specifying when a respective application function call of the application function calls was made, and wherein the synchronizing comprises correlating the test steps with the application function calls using the timestamps in the collected test step information and the timestamps in the collected profiling information.

8. The method of claim 1, wherein the synchronization data values in the collected test step information comprise checkpoints associated with the respective test steps, and the synchronization data values in the collected profiling information comprise checkpoints associated with the application function calls, and wherein the synchronizing comprises correlating the test steps with the application function calls using the checkpoints in the collected test step information and the checkpoints in the collected profiling information.

9. The method of claim 1, wherein the profiling information further comprises values of parameters passed to the application during the executing of the script.

10. The method of claim 1, wherein the plurality of test steps comprise actions of a user with respect to a graphical user interface, and wherein the synchronizing comprises correlating the plurality of test steps comprising the actions of the user with the application function calls using the synchronization data values in the collected test step information and the synchronization data values in the collected profile information.

11. The method of claim 1, wherein the test step information further comprises information of an order of execution of the plurality of test steps, and information relating to a number of iterations of a test step of the plurality of test steps.

12. The method of claim 1, wherein the collected profiling information comprises values of parameters returned in response to the application function calls that invoke respective functions.

13. A system, comprising:
    a processor; and
    a memory device that stores machine-readable instructions executable on the processor to:
      automatically execute a plurality of test steps according to a script for testing an application;
      store test step information corresponding to the plurality of test steps, the stored test step information comprising synchronization data values for respective test steps of the plurality of test steps;
      store profiling information describing an operation of the application during execution of the plurality of test steps, the stored profiling information comprising application function calls and synchronization data values associated with the application function calls; and
      automatically synchronize the test step information and the profiling information, the synchronizing comprising correlating respective test steps of the plurality of test steps with the application function calls using the synchronization data values in the stored test step information and the synchronization data values in the stored profile information.

14. The system of claim 13, wherein the stored profiling information further comprises parameters passed to the application during the execution of the plurality of test steps, and exception data.

15. The system of claim 13, wherein the synchronization data values in the stored test step information comprise timestamps associated with the respective test steps, each timestamp in the stored test step information indicating when a respective test step of the plurality of test steps was performed, and the synchronization data values in the stored profiling information comprise timestamps associated with the application function calls, each timestamp in the stored profiling information specifying when a respective application function call of the application function calls was made, and wherein the synchronizing comprises correlating the test steps with the application function calls using the timestamps in the stored test step information and the timestamps in the stored profiling information.

16. The system of claim 13, wherein the synchronization data values in the stored test step information comprise checkpoints associated with the respective test steps, and the synchronization data values in the collected profiling information comprise checkpoints associated with the application function calls, and wherein the synchronizing comprises correlating the test steps with the application function calls using the checkpoints in the stored test step information and the checkpoints in the stored profiling information.

17. The system of claim 13, wherein the plurality of test steps comprise actions of a user with respect to a graphical user interface, and wherein the synchronizing comprises correlating the plurality of test steps comprising the actions of the user with the application function calls using the synchronization data values in the stored test step information and the synchronization data values in the stored profile information.

18. A non-transitory computer-readable medium comprising instructions executable in a system to:
   execute a script for testing an application;
   collect test step information corresponding to a plurality of test steps performed in accordance with the script, the collected test step information comprising synchronization data values for respective test steps of the plurality of test steps;
   collect profiling information during execution of the script, the collected profiling information comprising application function calls and synchronization data values associated with the application function calls, each of the application function calls by the application invoking a corresponding function; and
   synchronize the test step information and the profiling information using the synchronization data values in the collected test step information and the synchronization data values in the collected profile information.

19. The non-transitory computer-readable medium of claim 18, wherein the synchronizing comprises pairing respective test steps of the plurality of test steps with corresponding application function calls of the application function calls using the synchronization data values in the collected test step information and the synchronization data values in the collected profile information.

* * * * *